United States Patent [19]
Flanagan

[11] Patent Number: 5,925,607
[45] Date of Patent: *Jul. 20, 1999

[54] CLEANING AND POLISHING COMPOSITION

[75] Inventor: Kenneth J. Flanagan, St. Peters, Pa.

[73] Assignee: Sara Lee Corporation, Douglassville, Pa.

[*] Notice: This patent is subject to a terminal disclaimer.

[21] Appl. No.: 09/040,615

[22] Filed: Mar. 18, 1998

Related U.S. Application Data

[63] Continuation-in-part of application No. 08/625,336, Apr. 1, 1996, Pat. No. 5,753,607.

[51] Int. Cl.⁶ .............................. C11D 3/24; C11D 1/825; C11D 3/32; C09G 1/12
[52] U.S. Cl. .................. 510/242; 510/241; 510/406; 510/417; 510/421; 510/466; 510/475; 510/501; 510/528; 510/476; 510/480; 106/3; 106/10; 106/12; 106/8; 106/2
[58] Field of Search ................................. 106/3, 10, 12, 106/8, 2; 510/241, 242, 406, 417, 421, 466, 475, 501, 528, 476, 480

[56] References Cited

U.S. PATENT DOCUMENTS

| | | | |
|---|---|---|---|
| 5,085,695 | 2/1992 | Randen et al. | 106/8 |
| 5,135,740 | 8/1992 | Katz et al. | 424/401 |
| 5,156,843 | 10/1992 | Leong et al. | 424/411 |
| 5,256,422 | 10/1993 | Albert et al. | 424/450 |
| 5,599,533 | 2/1997 | Stepniewski et al. | 424/78.02 |

*Primary Examiner*—Mark Kopec
*Assistant Examiner*—Charles Boyer
*Attorney, Agent, or Firm*—John Lezdey & Assoc.

[57] ABSTRACT

A furniture cleaning and polishing composition that provides protection against water. The composition contains an admixture of A) about 0.01 to 4% by weight of a water repelling halofluoro polymer; B) up to 15% mineral oil; C) about 3 to 25% hydrocarbon solvent; D) about 0.1 to 5% silicone oil; about 0.01 to 5% surfactant, and the remainder water.

18 Claims, No Drawings

CLEANING AND POLISHING COMPOSITION

RELATED APPLICATION

This application is a continuation-in-part of application Ser. No. 08/625,336 filed Apr. 1, 1996, now U.S. Pat. No. 5,753,607.

FIELD OF THE INVENTION

The present invention relates to a cleaning and polishing composition having improved depth-of-gloss and water protection. More particularly, the invention provides an aqueous composition comprising a water repelling halofluoro polymer, a hydrocarbon oil or solvent and silicone oil which can be used in an aerosol.

BACKGROUND OF THE INVENTION

In order to effectively clean furniture and similar surfaces (e.g., formica-topped structures), it is often necessary to utilize various cleaning and dusting compositions. A dusting composition is simply any product that will aid in the removal of dust from the surface being cleaned. Due to the nature of these surfaces, however, it is necessary to ensure that the compositions utilized will not harm the finish while they are cleaning. Thus, it is usually not desirable to employ harsh solvents or merely water, especially when the surface is finished wood. Harsh organic solvents can destroy the finish, prevent the surface from taking on a desired shine or wax coating, or even destroy the wood itself. Water can also be damaging to the finish and/or the wood itself. It is also desirable that these cleaning products enhance the ability to remove dust from the surface, and leave a shine after the laying down of a continuous layer either with or without wax.

It is desirable to provide furniture polish with ingredients which will protect the furniture against water and water rings which is common when placing a cold drink on furniture. It is further desirable to provide the furniture with a light reflectance property which is aesthetically pleasing to the eye in the event that a major portion of incident light rays should pass through the coating, and thereafter is reflected by the furniture which is called "depth-of-gloss".

Because of their particular optical properties, a number of presently commercially available dimethyl silicones are utilized in furniture polish compositions in addition to such film-forming ingredients as waxes and/or surfactants and/or oils, for example, for purpose of improving depth-of-gloss but often do not result in good water resistance. However, in some cases wax addition may undesirably affect total smear recovery and cause water rings, and oil and/or surfactant addition undesirably affects smear visibility.

U.S. Pat. No. 3,579,540 to Ohlhausen discloses a water repellant composition for use on non-porous substrate surfaces. The disclosed composition contains a mineral acid and an alkylpolysiloxane, which produces a strongly adherent and durable water repellant film upon the substrate following application.

U.S. Pat. No. 5,399,282 to Hansen et al discloses an aerosol dusting and cleaning composition particularly suited for cleaning furniture which includes one or more paraffinic or napthenic oils, one or more volatile solvents, terpene, a glycol ether, an emulsifier system and water.

U.S. Pat. No. 5,112,394 to Miller discloses a furniture polish composition which contains dimethyl silicones and poly (dimethyl)-copoly(methyl) oxygen containing siloxane copolymers.

U.S. Pat. No. 5,085,695 to Randen et al, which is herein incorporated by reference, discloses a wax-free cleaner-polisher composition which contains silicone oil and/or mineral oil and an fluoroalkyl polymer.

U.S. Pat. No. 4,689,168 to discloses a hard surface cleaning composition containing an organic polar solvent, a volatile organosiloxane and a surfactant.

The above noted cleaning and polishing compositions do not provide a satisfactory depth-of-gloss and water resistance.

SUMMARY OF THE INVENTION

The present invention provides a cleaning and polishing composition that provides protection against water damage. The composition comprises an admixture by weight of total composition of:

A. about 0.01 to 4% of a water repelling and film forming halofluoro polymer; wherein halo is bromo or chloro;
B. up to 15% mineral oil;
C. about 3 to 25% hydrocarbon solvent having a refractive index of about 1.35 to 1.48, preferably about 3 to 9%;
D. about 0.1 to 15% silicone oil, preferably about 2 to 5%;
E. about 0.01 to 5% surfactant, and
F. the remainder being water.

Advantageously, the composition contains mineral oil and the silicone oil is a blend of high and low molecular weight dimethyl polysiloxanes.

The composition is preferably used in an aerosol dispenser.

The expression "water repelling and film forming halofluoro polymer" is a term in the art which means that the polymer is capable of being used in an aqueous system through either solubility, dispersability, or emulsification and forms a water repelling system when applied on a hard surface.

Advantageously, when the halofluoro polymer is a chlorofluoroamide polymer it is used with about 3 to 9% by weight of a hydrocarbon oil.

It is an object of the invention to provide a furniture cleaning and polishing composition which provides protection against water.

It is another object of the invention to provide an aerosol which cleans and polishes furniture and provides protection against water.

It is yet another object to provide a furniture cleaning and polishing composition which contains a halofluoro polymer and/or with mineral oil.

It is still another object of the invention to provide a cleaning and polishing composition which provides a film coating having an improvement in depth of gloss.

These and other objects and advantages of the present invention will be better understood from the following description of preferred embodiments.

FLUOROLINK has the following specification:

| | |
|---|---|
| average mol. wt. | 830 |
| average mol. wt. of fluorinated part | 560 |
| % F | 42 |
| % H | 42 |
| Ratio F/H | 9.4 |
| % Cl | 4.2 |

DETAILED DESCRIPTION OF THE INVENTION

The improved protective cleaning and polishing composition of the invention is an oil-in-water or water-in-oil dispersion comprising a) a water repelling and film forming halofluoro polymer wherein halo is bromo or fluoro, b) a hydrocarbon solvent having a refractive index of about 1.35 to 1.48, c) silicone oil, d) surfactant, e) water and optionally mineral oil, emulsifiers, fragrances and preservatives. The term "dispersion" as used herein broadly encompasses systems wherein the oil phase as an emulsion, as a colloidal suspension, as a solute, or a combination thereof, e.g., partially in solution and partially in emulsion form.

According to one embodiment of the invention the mineral oil, silicone oil, surfactant and polymer each have a refractive index of about 1.35 to 1.48. When the components have their refractive indices within this range the final product provides a film coating having excellent depth-of-gloss.

The water repelling halofluoro polymers which can be used in the compositions of the present invention include fluorochloroamide polymers, polytrifluorochloroethylene, fluorochloroalkyl polymers, fluorochloroacrylic polymers, chlorofluorosilicone polymers and the like. A preferred polymer has a refractive index of about 1.35 to 1.48.

The most preferred halofluorinated polymers are the fluorochloroamide polymers sold under the trademark "FLUOROLINK 418" sold by Ausimont, U.S.A. Others include FLUOROLINK (201) a chlorofluoro phosphate ester, "FLUOROLINK 407" a chlorofluorosilane and "FLUOROLINK 300" a chlorofluorocarboxylic acid.

The silicone oils which can be used in the present invention are generally those which are utilized in the prior art furniture polishing compositions. The preferred are those having a refractive index of about 1.35 to 1.48. It has been found to be advantageous to utilize at least two polydimethylsiloxane fluids which have different viscosities. Suitable polydimethyl siloxane fluids are available from GE Silicones under the trademark SF96 FLUIDS in viscosities of 50, 100, 350, 500 and 1000 centistoke, SF1706 amine functional silicones that contain amine functional and polydimethylsiloxane units and VISCASIL FLUIDS in viscosities of 5,000; 10,000; 12,500; 30,000; 60,000 and 100,000 centistoke.

Suitable hydrocarbon solvents include isoparaffinic hydrocarbons, including $C_7$ to $C_{16}$ isoparaffinic hydrocarbon sold under the trademark Isopar by Exxon Chemicals, Houston, Tex. These isoparaffinic hydrocarbons are branched chained fully saturated hydrocarbons and are characterized by boiling range. These mixtures are available in initial boiling point ranges of from 98° C. to 255° C. and have a refractive index of 1.35 to 1.48. In addition to the isoparaffinic hydrocarbons, low odor petroleum solvent having a boiling range of 195° C. to 250° C., kerosene, pine oil, napthenic and d-Limonene are also acceptable. From an odor standpoint, the isoparaffinic hydrocarbons are preferred as these materials are low in odor. However if odor is not a consideration, substantially any of the above solvents can be utilized. For a variety of reasons, it is preferred to utilize certain relatively low boiling point solvents so that the solvent is in limited contact with the wood finish. It is preferred to use an isoparaffinic hydrocarbon solvent having an initial boiling point range from about 98° C. to about 156° C. and most preferably about 116° C.

A preferred hydrocarbon oil is Sunpar LW 107 (manufactured by Sun Refining and Marketing) which is a light paraffinic petroleum distillate having a molecular weight of about 250–300. This oil is preferably used in the amount of about 3 to 9%.

The compositions of the present also include a mixture of nonionic surfactants. These nonionics are present in minuscule amounts and are present only to help stabilize the emulsion water-out portion of this system. The first component of the nonionic surfactant mixture is a sorbitan surfactant, such as sorbitan monolaurate, sorbitan monooleate, sorbitan trioleate and mixtures thereof.

As an additional nonionic surfactant, it is often desirable to incorporate in a small amount, i.e. from 0.1 to 3% by weight of an ethoxylated sorbitan nonionic such as those sold under the tradename Tweens from ICI America. Suitable nonionic include ethoxylated sorbitan monolaurate plus 20 moles of ethylene oxide, ethoxylated sorbitan monopalmitate with 20 moles ethylene oxide, ethoxylated sorbitan monosterate with 20 moles ethylene oxide, ethoxylated sorbitan monooleate with 20 moles ethylene oxide and mixtures thereof. The Tween type ethyoxylated sorbitan nonionics, when combined with the nonethoxylated sorbitan nonionics in appropriate amounts, provide excellent emulsion stability, and increased soil removal performance for the oil-out portion of the emulsion and still retain improved inhibition of soil redeposition. Other nonionic surfactants include the ethoxylated nonylphenols such as Surfonic N series available from Jefferson Chemical, the ethoxylated octophenols, including the Triton X series available from Rohm and Haas, the ethoxylated secondary alcohols such as Tergitol series available from Union Carbide, the ethyoxylated primary alcohol series, such as the Neodols available from Shell Chemical, the polymeric ethylene oxides such as the Pluronics available from BASF Wyandotte. Anionic surfactants such as triethanolamine (TEA) which aids in emulsification may be added.

When a halofluoro polymer is used in the formulation, it has been found to be advantageous to also use mineral oil and the surfactant polysiloxane polyalkylether copolymer (cetyl dimethicone copolyol) which has a refractive index at 20° C. of 1.437–1.443 and a specific gravity of 0.915–0.945 $g/cm^3$ that is sold under the trademark ABIL EM 90 by Goldschmidt of Virginia. A similar product is sold under the trademark TEGOPREN 7008 by Goldschmidt as well.

It has been surprisingly discovered that a silicone copolyol such as ABIL EM-90 is soluble in mineral oil and gives a clear solution when mixed together. This mixture has a refractive index of 1.4670 and a specific gravity of 0.8631. This mixture when used in a furniture polish reduces the turbidity of fluoropolymers in silicone polishes with or without oil present. Also, the combination in a silicone polish reduces the problem of "rainbowing", a visible phenomenon in which the coating exhibits a multicolor appearance.

The compositions of the invention may be applied by spraying with a pump type spray dispenser or by charging the polish into an aerosol spray can using conventional techniques. The composition may also be applied by wiping or brushing with a cloth, brush or sponge. The preferred method of application is by aerosol spray. The general practice for applying this composition is to shake the container well before using, and, holding the container in an upright position, and then spraying the composition onto the surface from a distance of approximately 15.24 centimeters (six inches). The surface is immediately wiped with a clean soft absorbent cloth. The surface may be buffed additionally to the desired shine. Alternately, the spray may be directed to a soft absorbent cloth and the treated cloth wiped onto the surface to be cleaned and polished.

If the composition is to be used in an aerosol form, the typical aerosol compositions include from about 70% to 95% of the composition of the present invention and from about 5% to 30% of a propellent. Any of the typical aerosol propellants, such as hydrocarbon, halogenated hydrocarbon, dimethyl ether and compressed gases (e.g. $CO_2$, $N_2$, etc.) can be used. Typical hydrocarbon propellants include propane, butane, isobutane and pentane.

The present invention is more particularly described in the following examples, which is intended as illustrative only, since numerous modifications and variations therein will be apparent to one skilled in the art.

EXAMPLE I

An aerosol composition was prepared with the following ingredients.

| Ingredient | % by weight Finished Product | % Finished Product plus Propellant |
|---|---|---|
| Fluorochloroamide | 0.080 | 0.073 |
| ISOPAR E | 16.480 | 14.982 |
| SUNPAR LW 107 | 3.500 | 3.182 |
| Silicone 100 cst | 2.000 | 1.818 |
| Silicone 10,000 cst | 1.000 | 0.909 |
| ABIL EM 90 | 0.300 | 0.273 |
| Water | 76.180 | 69.254 |
| TEA | 0.080 | 0.073 |
| Glutaraldehyde | 0.060 | 0.054 |
| Fragrance | 0.320 | 0.291 |
| Propellant | | 9.091 |
| Total % | 100.000 | 100.000 |

In lieu of ABIL EM 90 there may be used TEGOPREN 7008.

Isopar E was placed in a mixing tank and heated with stirring to a temperature of 110° F. The fluorochloroamide was added and the mixture stirred at a temperature between 110 to 120° F. After all the fluorochloromide was dissolved, the temperature of the mixture was brought to 90° F. The mixing was continued and then was added the silicone oil, ABIL EM and SUNPAR LW 107. When the mixture 1139-17A became homogeneous, the water was added and then glutaraldehyde and TEA. The resulting mixture was then sheared until the mixture had a viscosity of 1200 cps at 77° F. ±2° F.

EXAMPLE II

A cleaning and polishing composition is prepared by mixing the following ingredients according to the procedure of Example I:

| Ingredient | % by weight |
|---|---|
| Fluorochloroamide Polymer | 0.30 |
| Surfactant | 2.00 |
| Hydrocarbon Oil (SUNPAR LW 107) | 16.00 |
| Silicone Oil Blend | 3.00 |
| Preservative | 0.20 |
| Fragrance | 0.20 |
| Water | QS |
| | 100% |

The composition had a viscosity of 1200 cps.

The composition provided water resistance and had good clarity.

EXAMPLE III

A cleaning and polishing composition is prepared by admixing the following ingredients according to the procedure of Example I:

| Ingredient | % by weight |
|---|---|
| Fluorochloropolymer | 0.08 |
| Isopar E | 12.30 |
| Mineral Spirits | 4.30 |
| Dimethyl Polysiloxane 350 CST | 1.28 |
| Dimethyl Polysiloxane 10000 CST | 1.80 |
| Abil EM90 | 0.50 |
| Span 80 | 0.08 |
| Tween 80 | 0.09 |
| Carbopol 1622 | 0.04 |
| TEA | 0.02 |
| Glutaraldehyde 25% | 0.06 |
| Sunpar LW 107 | 3.50 |
| Water | QS |
| | 100% |

EXAMPLE IV

A cleaning and polishing composition suitable for use in an aerosol is prepared by admixing the following ingredients according to the procedure of Example I:

| Ingredient | % by weight |
|---|---|
| FLUOROLINK | 0.08 |
| Tegopren 7008 (Nonionic Surfactant) | 0.50 |
| Sunpar LW 107 | 3.00 |
| Dimethyl Siloxane (100 CPS/ 10,000 CPS (3.1) | 3.00 |
| Preservative | 0.20 |
| Fragrance | 0.20 |
| Exxon 120 (L.O. Mineral Spirits) | 16.00 |
| Water | QS |
| | 100% |

EXAMPLE V

A polishing and cleaning composition suitable for use in an aerosol having good depth-of-gloss is prepared by admixing the following ingredients:

| Ingredient | % by weight |
|---|---|
| Fluorochloroalkyl polymer | 0.08 |
| Isopar E | 16.48 |
| Dimethyl siloxane 100 CPS | 2.00 |
| Dimethyl siloxane 10,000 CPS | 1.00 |
| ABIL EM 90 | 0.30 |
| TEA | 0.08 |
| Glutaraldehyde 25% | 0.06 |
| Fragrance | 0.32 |
| Sunpar LW 107 | 3.50 |
| Water | QS |
| | 100% |

Comparative Example I

A cleaning and polishing composition with a microwax in lieu of a fluorochloro polymer was prepared with the following ingredients:

| Ingredient | % by weight |
| --- | --- |
| Microwax | 0.25 |
| Isopar E | 16.48 |
| Silicone Oil (100 cps) | 1.50 |
| Silicone Oil (10000 cps) | 0.50 |
| TEA | 0.08 |
| Glutaraldehyde 25% | 0.06 |
| Fragrance | 0.32 |
| Water | QS |
| | 100% |

The composition produced a clear film having acceptable emulsion quality and rub out characteristics but poor water repellency.

EXAMPLE VI

| Composition 1 | Composition 2 | Finished Product % By Weight | Finished Product Plus Propellant % By Weight |
| --- | --- | --- | --- |
| Fluorochloroamide | Fluoroamide | 0.08 | 0.073 |
| ISOPAR E | ISOPAR E | 16.48 | 14.982 |
| SUNPAR LW 107 | SUNPAR LW 107 | 3.50 | 3.182 |
| Silicone 100 cts | Silicone 100 cts | 2.00 | 1.818 |
| Silicone 10,000 cts | Silicone 10,000 cts | 1.00 | 0.909 |
| Tegopren 7008 | Tegopren 7008 | 0.30 | 0.073 |
| Water | Water | 76.18 | 69.254 |
| TEA | TEA | 0.08 | 0.073 |
| Glutaraldehyde | Glutaraldehyde | 0.06 | 0.054 |
| Fragrance | Fragrance | 0.32 | 0.291 |
| Propellant | Propellant | | 9.091 |
| Total | | 100.00 | 100.000 |

Test Method

Commercial shelving (Wal-Mart Play-box shelving) was purchased from Wal-Mart. The shelving was sectioned off and each section was treated with either 1 coat or 3 coats of the various test products. The test products consisted of Composition 1 or Composition 2 or Behold or Pledge. Fifteen (15) minutes elapsed between the applications of each coat of product. After 1 hour 100 ml round bottom jars containing ice water were placed on top of a treated or an untreated surface. Before placing the jar on the surface, 2.5 ml of coffee (1g coffee/100 ml water) was applied to the surface. The next morning (about 18 hours later), the jars were removed. After removing the excess water with a paper towel, the wood was checked for coffee stains or water damage.

Data

Composition 1 (fluorochloroamide polymer) was compared to Composition 2 (fluoroamide polymer), Behold and Pledge. Results in the tables below are reported for applications of 1 coat and 3 coats.

The ratings for effectiveness are 0–3 as described below.

| | | | |
| --- | --- | --- | --- |
| 0 = same | 1 = a little better | 2 = much better | 3 = much, much better |
| | −1 = a little worse | | |

For Board #1, one coat of Composition 1 was not as good as one coat or three coats of Composition 2 because the efficacy value reported is −1. In addition, Composition 1 was the same as Pledge when one coat was applied because the efficacy value it received was 0.

| | Compared to Composition 2 | Compared to No Coat | Compared to Pledge | Compared to Behold |
| --- | --- | --- | --- | --- |
| Board #1 | | | | |
| Composition 1 | | | | |
| 1 Coat | −1 | 1 | 0 | 2 |
| 3 Coat | −1 | 3 | 1 | 2 |
| Board #2 | | | | |
| Composition 1 | | | | |
| 1 Coat | −1 | 3 | 1 | 2 |
| 3 Coat | −1 | 3 | 1 | 2 |

Results:

Although Composition 1 was more effective than, Pledge or Behold, when three coats were applied, it did not resist water as effectively as Composition 2.

What is claimed is:

1. A cleaning and polishing composition that provides protection against water which comprises by weight of total composition an admixture of:
   A. about 0.01 to 4% of a water repelling and film forming halofluoro polymer; wherein halo is bromo or chloro;
   B. up to 15% mineral oil;
   C. about 3 to 25% hydrocarbon solvent having a refractive index of about 1.35 to 1.48;
   D. about 0.1 to 15% of at least one silicone oil;
   E. about 0.01 to 5% of at least one surfactant; and
   F. water.

2. The composition of claim 1 wherein said silicone oil is a mixture of dimethyl polysiloxane.

3. The composition of claim 1 wherein said silicone oil has a refractive index of about 1.3950 to 1.4050.

4. The composition of claim 1 which contains mineral oil.

5. The composition of claim 1 including a fragrance.

6. The composition of claim 1 which contains synthetic or natural wax.

7. The composition of claim 1 wherein said halofluoro polymer is selected from the groups consisting of polytrifluorochloroethylene, fluorochloroamide polymer, fluorochlorosilicone polymer, fluorochloroalkyl polymer and fluorochloroacrylic polymer.

8. The composition of claim 1 wherein said surfactant is a mixture of nonionic surfactants.

9. The composition of claim 1 in an aerosol.

10. A cleaning and polishing composition that provides protection against water which comprises by weight of total composition the admixture of:
   A. about 0.05 to 1% of a water repelling and film forming fluorochloroamide polymer having a refractive index of about 1.35 to 1.430;
   B. up to 15% mineral oil;
   C. about 3 to 20% of an isoparaffinic hydrocarbon solvent having a refractive index of about 1.35 to 1.48;
   D. about 0.1 to 5% of a polysiloxane;
   E. about 0.01 to 3% of a surfactant; and
   F. water.

11. The composition of claim 10 wherein said dimethyl polysiloxane is a blend of dimethyl polysiloxanes having a refractive index of about 1.3950 and 1.4050.

12. The composition of claim 10 which contains mineral oil.

13. The composition of claim 10 wherein said surfactant is nonionic.

14. The composition of claim 10 wherein said composition contains dimethylsiloxane.

15. The composition of claim 10 including a fragrance.

16. The composition of claim 10 including cetyl dimethicone copolyol and mineral oil.

17. The composition of claim 10 wherein said composition has a viscosity of at least 1200 cps.

18. A method for imparting water repellency to furniture which comprises treating the furniture with the composition of claim 1.

* * * * *